United States Patent
Manickavasagam

(10) Patent No.: US 11,086,961 B2
(45) Date of Patent: Aug. 10, 2021

(54) VISUAL LEAF PAGE IDENTIFICATION AND PROCESSING

(71) Applicant: Google LLC, Mountain View, CA (US)

(72) Inventor: Venkatesh Manickavasagam, Mountain View, CA (US)

(73) Assignee: Google LLC, Mountain View, CA (US)

( * ) Notice: Subject to any disclaimer, the term of this patent is extended or adjusted under 35 U.S.C. 154(b) by 756 days.

(21) Appl. No.: 15/479,927

(22) Filed: Apr. 5, 2017

(65) Prior Publication Data

US 2018/0293325 A1    Oct. 11, 2018

(51) Int. Cl.

| | |
|---|---|
| *G06F 16/00* | (2019.01) |
| *G06F 7/00* | (2006.01) |
| *G06F 16/957* | (2019.01) |
| *H04L 29/08* | (2006.01) |
| *G06F 3/0483* | (2013.01) |
| *G06K 9/46* | (2006.01) |
| *G06F 16/28* | (2019.01) |
| *G06F 16/951* | (2019.01) |

(Continued)

(52) U.S. Cl.
CPC ........ *G06F 16/9577* (2019.01); *G06F 3/0483* (2013.01); *G06F 16/24578* (2019.01); *G06F 16/287* (2019.01); *G06F 16/951* (2019.01); *G06F 16/958* (2019.01); *G06K 9/4604* (2013.01); *H04L 67/02* (2013.01); *H04L 67/10* (2013.01)

(58) Field of Classification Search
CPC .. G06F 16/24578; G06F 16/285; G06F 16/35; G06F 16/9577; G06F 16/287; G06F 16/958; G06F 16/951

USPC ........................................................ 707/723
See application file for complete search history.

(56) References Cited

U.S. PATENT DOCUMENTS

| | | | |
|---|---|---|---|
| 8,078,625 B1 * | 12/2011 | Zhang .................. | G06F 16/353 707/748 |
| 2008/0010292 A1 * | 1/2008 | Poola .................... | G06F 16/986 |
| 2009/0171986 A1 * | 7/2009 | Chitrapura ............ | G06F 16/951 |

(Continued)

FOREIGN PATENT DOCUMENTS

GB        2446176        8/2008

OTHER PUBLICATIONS

International Search Report and Written Opinion issued in International Application No. PCT/US2017/065324, dated Feb. 6, 2018, 13 pages.

(Continued)

*Primary Examiner* — Raquel Perez-Arroyo
(74) *Attorney, Agent, or Firm* — Dority & Manning, P.A.

(57) ABSTRACT

In some implementations, a method includes, for each of multiple hosts: identifying visual leaf pages hosted by the host that are each a web page including image data defining an image or a video that is prominently displayed relative to all other content of the web page, identifying a set of hub pages hosted by the host that each link to at least one of the visual leaf pages through an image-based link, and for each hub page, generating cluster data representing the visual leaf pages to which the hub page links by determining, for each visual leaf page, a set of feature values that each indicate pre-defined features of the visual leaf page, and generating, from the sets of feature values, a set of central feature values as the cluster data for the hub page that indicate a central tendency of each respective pre-defined feature.

20 Claims, 7 Drawing Sheets

(51) Int. Cl.
*G06F 16/2457* (2019.01)
*G06F 16/958* (2019.01)

(56) References Cited

U.S. PATENT DOCUMENTS

| | | | | |
|---|---|---|---|---|
| 2012/0158724 A1* | 6/2012 | Mahadevan | .......... | G06F 16/954 |
| | | | | 707/737 |
| 2012/0221557 A1* | 8/2012 | Edmonds | .............. | G06F 16/951 |
| | | | | 707/723 |
| 2015/0154266 A1* | 6/2015 | Krishnan | .............. | G06F 16/951 |
| | | | | 707/722 |

OTHER PUBLICATIONS

Chandralcala et al. "News web page classification using url content and structure attributes," $2^{nd}$ International Conference on Next Generation Computing Technologies, Oct. 14, 2016, 6 pages.

PCT Written Opinion issued in International Application No. PCT/US2017/065324, dated Jan. 30, 2019, 5 pages.

* cited by examiner

VISUAL LEAF PAGE IDENTIFICATION AND PROCESSING

BACKGROUND

The Internet provides access to a variety of resources. Characterizing the format and content of any particular page is useful for search engine processing. For example, pages that are primarily textual in content may be useful for certain types of searches, while pages that are primarily visual in content may be useful for other types of search.

A particular resource that may be useful for some search operations is a visual leaf page. A leaf page is a terminal page to acquire information, perform an action, or provide a particular set of information about topic described in that page. While a leaf page may, of course, have links to other pages, it is still considered a "terminal" page in the sense that is a page designed to specifically achieve the goals described above. A visual leaf page is a leaf page that has a dominant intent for one or more salient images representing the topics described in that page. Accordingly, the removal of the images in that page will cause it to become significantly less informative. For example, when a user requests image search results from a search engine for a particular type of activity, such as shopping or looking for recipes, visual leaf pages may provide content that is highly relevant to what the user is searching for, and these visual leaf pages may provide results that are more relevant than results presented by a page that is not a visual leaf page.

SUMMARY

This document relates to identifying visual leaf pages.

In general, one innovative aspect of the subject matter described in this specification can be embodied in a method that includes, for each of multiple hosts, identifying, by one or more computers, visual leaf pages hosted by the host, wherein each visual leaf page is a web page including image data defining an image or a video that is prominently displayed relative to all other content of the web page, identifying, by the one or more computers, a set of one or more hub pages hosted by the host and that each link to at least one of the visual leaf pages through an image-based link on the hub page, and for each hub page of the set of one or more hub pages, generating cluster data representing the visual leaf pages to which the hub page links. The generating includes determining, for each visual leaf page to which the hub page links, a set of feature values, wherein each feature value is indicative of pre-defined feature of the visual leaf page, and generating, from the sets of feature values, a set of central feature values as the cluster data for the hub page, the set of central feature values being indicative of a central tendency of each respective pre-defined feature of the visual leaf pages.

These and other embodiments can each optionally include one or more of the following features.

In some examples, the method includes, for each host of the multiple hosts, merging the cluster data from the host into cluster models, wherein each cluster model is generated from two or more sets of central feature values. The merging includes determining respective differences between two or more sets of central feature values, and for each of the two or more set of central feature values for which the respective difference is less than a predetermined threshold, merging the two or more sets of central feature values into a cluster model, the cluster model being indicative of a central tendency of the visual leaf pages in the two or more cluster models being merged, and uniquely associating the cluster model with the host. The method can further include receiving data indicative of a web page responsive to a query, the data including a set of feature values for the web page, wherein each feature value is indicative of a pre-defined feature of the web page, and data indicating a host of the web page, identifying, based on the host of web page, cluster models that are uniquely associated with the host, applying each of the identified cluster models to the web page to generate a respective model score for the web page, selecting a model score that is a highest model score of the respective model scores, determining whether the selected model score for the web page meets a predetermined threshold model score, and in response to determining that the selected model score for the web page meets the threshold model score, classifying the web page as a visual leaf page. In some examples, the web page has a corresponding search score for the query, and the method includes modifying, based on the classification of the web page as a visual leaf page, the search score for the web page.

In some examples, identifying visual leaf pages hosted by the host is based on a semantic analysis of the image or video compared to all the other content of the page meeting a threshold of relatedness.

In some examples, identifying visual leaf pages hosted by the host is based on determining that the image data indicates a customizable selection of images.

In some examples, identifying visual leaf pages hosted by the host is based on determining that the image or video is shown in a central portion of the web page and is at least a threshold proportion larger in area than all the other content on the web page.

In some examples, identifying visual leaf pages hosted by the host is based on determining that the image data indicates a grid-like structure of a plurality of images or videos.

In some examples, generating cluster data representing the visual leaf pages to which the hub page links for each hub page of the set of one or more hub pages includes determining that each of the visual pages to which the hub page links has a same URL depth.

In some examples, the set of feature values for the visual leaf page is a vector having an element for each feature value in the set of feature values.

In some examples, the cluster data for the hub page is a vector having, for each feature value in the set of feature values, elements of a mean and a standard deviation of the feature value; and wherein the cluster model is a vector having, for each feature value in the set of feature values, elements of a mean and a standard deviation of the feature value.

In general, another innovative aspect of the subject matter described in this specification can be embodied in a system that includes one or more computers and a data store storing instructions that when executed by the one or more computers, cause the one or more computers to perform operations. The operations include, for each of multiple hosts, identifying, by the one or more computers, visual leaf pages hosted by the host, wherein each visual leaf page is a web page including image data defining an image or a video that is prominently displayed relative to all other content of the web page, identifying, by the one or more computers, a set of one or more hub pages hosted by the host and that each link to at least one of the visual leaf pages through an image-based link on the hub page, and for each hub page of the set of one or more hub pages, generating cluster data representing the visual leaf pages to which the hub page links. The generating includes determining, for each visual leaf page to which the hub page links, a set of feature values, wherein each feature value is indicative of pre-defined feature of the visual leaf page, and generating, from the sets of feature values, a set of central feature values as the cluster data for the hub page, the set of central feature values being indicative of a central tendency of each respective pre-defined feature of the visual leaf pages.

In some examples, the operations can include, for each host of the multiple hosts, merging the cluster data from the host into cluster models, wherein each cluster model is generated from two or more sets of central feature values. The merging includes determining respective differences between two or more sets of central feature values, and for each of the two or more set of central feature values for which the respective difference is less than a predetermined threshold, merging the two or more sets of central feature values into a cluster model, the cluster model being indicative of a central tendency of the visual leaf pages in the two or more cluster models being merged, and uniquely associating the cluster model with the host. The operations can further include can further include receiving data indicative of a web page responsive to a query, the data including a set of feature values for the web page, wherein each feature value is indicative of a pre-defined feature of the web page, and data indicating a host of the web page, identifying, based on the host of web page, cluster models that are uniquely associated with the host, applying each of the identified cluster models to the web page to generate a respective model score for the web page, selecting a model score that is a highest model score of the respective model scores, determining whether the selected model score for the web page meets a predetermined threshold model score, and in response to determining that the selected model score for the web page meets the threshold model score, classifying the web page as a visual leaf page. In some examples, the web page has a corresponding search score for the query, and the operations include modifying, based on the classification of the web page as a visual leaf page, the search score for the web page.

In some examples, identifying visual leaf pages hosted by the host is based on determining at least one of a semantic analysis of the image or video compared to all the other content of the page meets a threshold of relatedness, the image data indicates a customizable selection of images, the image or video is shown in a central portion of the web page and is at least a threshold proportion larger in area than all the other content on the web page, or that the image data indicates a grid-like structure of a plurality of images or videos.

In general, another innovative aspect of the subject matter described in this specification can be embodied in a non-transitory computer readable medium storing instructions that when executed by one or more computing devices, cause the one or more computing devices to perform operations. The operations include, for each of multiple hosts, identifying, by the one or more computers, visual leaf pages hosted by the host, wherein each visual leaf page is a web page including image data defining an image or a video that is prominently displayed relative to all other content of the web page, identifying, by the one or more computers, a set of one or more hub pages hosted by the host and that each link to at least one of the visual leaf pages through an image-based link on the hub page, and for each hub page of the set of one or more hub pages, generating cluster data representing the visual leaf pages to which the hub page links. The generating includes determining, for each visual leaf page to which the hub page links, a set of feature values, wherein each feature value is indicative of pre-defined feature of the visual leaf page, and generating, from the sets of feature values, a set of central feature values as the cluster data for the hub page, the set of central feature values being indicative of a central tendency of each respective pre-defined feature of the visual leaf pages.

In some examples, the operations can include, for each host of the multiple hosts, merging the cluster data from the host into cluster models, wherein each cluster model is generated from two or more sets of central feature values. The merging includes determining respective differences between two or more sets of central feature values, and for each of the two or more set of central feature values for which the respective difference is less than a predetermined threshold, merging the two or more sets of central feature values into a cluster model, the cluster model being indicative of a central tendency of the visual leaf pages in the two or more cluster models being merged, and uniquely associating the cluster model with the host. The operations can further include can further include receiving data indicative of a web page responsive to a query, the data including a set of feature values for the web page, wherein each feature value is indicative of a pre-defined feature of the web page, and data indicating a host of the web page, identifying, based on the host of web page, cluster models that are uniquely associated with the host, applying each of the identified cluster models to the web page to generate a respective model score for the web page, selecting a model score that is a highest model score of the respective model scores, determining whether the selected model score for the web page meets a predetermined threshold model score, and in response to determining that the selected model score for the web page meets the threshold model score, classifying the web page as a visual leaf page. In some examples, the web page has a corresponding search score for the query, and the operations include modifying, based on the classification of the web page as a visual leaf page, the search score for the web page.

Other embodiments of this aspect include corresponding systems, apparatus, and computer programs, configured to perform the actions of the methods, encoded on computer storage devices.

Particular embodiments of the subject matter described in this document can be implemented so as to realize one or more of the following advantages. In some search operations, it is desirable to rank visual leaf pages higher than non-leaf pages and non-visual leaf pages in image search results.

By classifying web pages as visual leaf pages and storing the identification of the visual leaf pages, a classifier system can achieve high precision and recall when returning search results. The system is able to operate without requiring human annotation of training data, reducing the amount of human input needed.

In some implementations, the classifier may be trained an unsupervised fashion without training data, which reduces training time. As such, the techniques discussed in this document enhance the autonomy of a search classifier system. The methods discussed in this document use a baseline set of data defining hub pages to boot strap the process of classifying web pages as visual leaf pages. By reducing the amount of classified data that is initially required, the method allows a classifier system to operate with reduced human input, and in some cases, entirely without human input.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, systems, and devices that classify particular web pages as visual leaf pages. The knowledge that pages are visual leaf pages may be used in a variety of applications, such as search operations. In some situations, such as when a user submits a query for which a visual leaf page would be more relevant to the user's search intent that a non-visual leaf page, it is advantageous to provide a visual leaf page as a result.

In operation, the system identifies multiple host systems, e.g., websites, to be indexed. For each host system, the system identifies visual leaf pages hosted by the host system. Each visual leaf page identified is a web page including image data defining an image or a video that is prominently displayed relative to all other content of the web page. The system may then perform a recursive process by identifying a set of one (or more) hub pages hosted by the host. Each identified hub page links to at least one of the visual leaf pages through an image-based link on the hub page. Thereafter, additional leaf pages from the hub pages may be discovered.

Once the leaf pages and hub pages are identified for a host system, the system, for each hub page of the set of one or more hub pages, generates cluster data representing the visual leaf pages to which the hub page links. This may involve determining, for each visual leaf page to which the hub page links, a set of feature values, and then generating, from the sets of feature values, a set of central feature values as the cluster data for the hub page. The set of central feature values are indicative of a central tendency of each respective pre-defined feature of the visual leaf pages.

Once the clusters are generated, they may be persisted a models and associated with their respective hosts. Thereafter, a search system receive data indicative of a web page responsive to a query. The data may include a set of feature values for the web page, and data indicating a host of the web page. The search system identifies identifying, based on the host of web page, cluster models that are uniquely associated with the host. The identified cluster models are applied to the web page to generate a respective model score for the web page. If the model score is high enough, the web page is determined to be a visual leaf page and is classified as such. Subsequent search operations that are dependent on a web page being a visual leaf page may then be performed.

Note that the techniques described in this document can also be implemented in situations where a user is browsing through available applications (e.g., in an online application store or a web browser) or in other environments (e.g., on publisher web pages). For brevity, much of the description that follows will refer to the search results environment.

Figure 1:
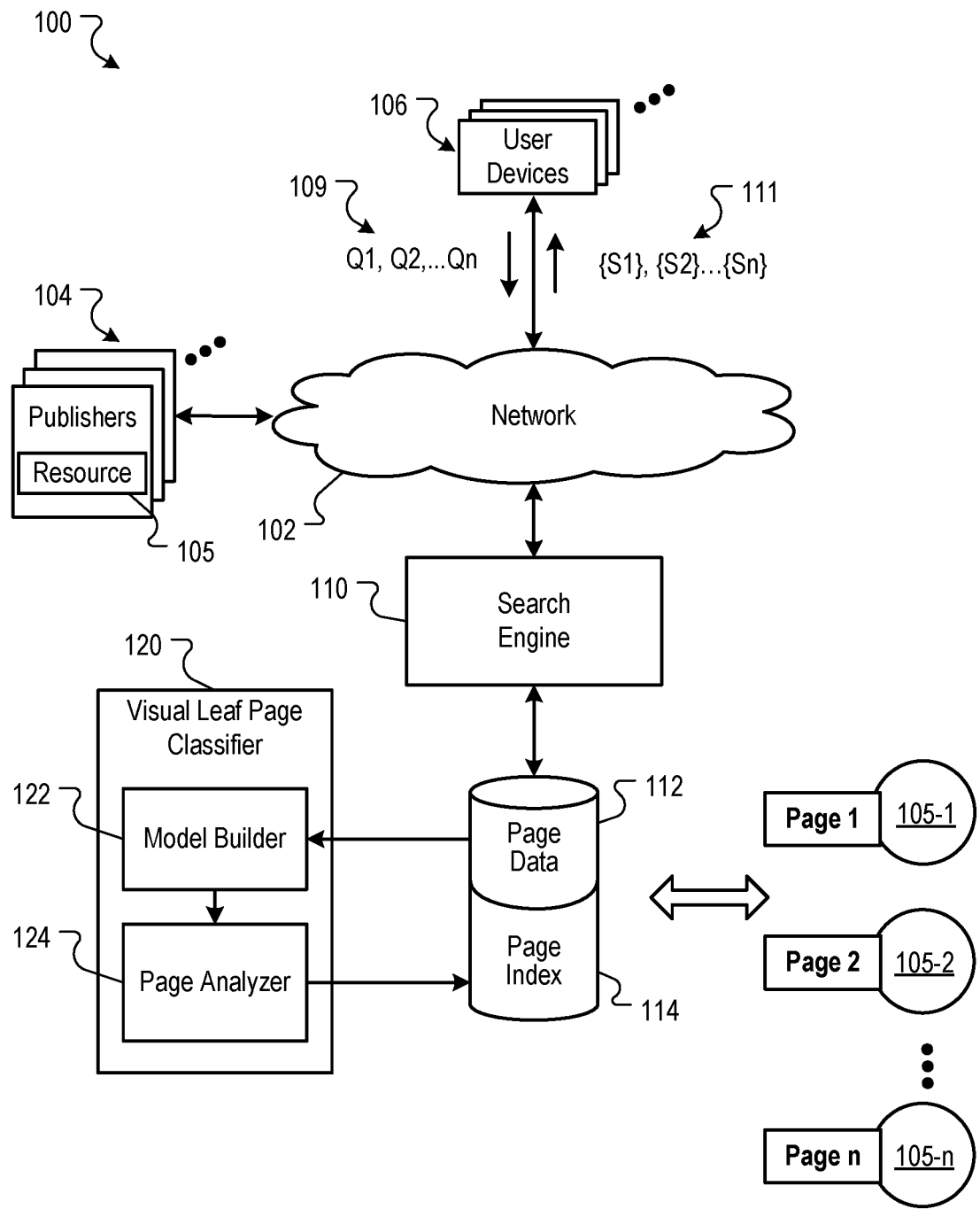
FIG. 1 is a block diagram of an example environment in which digital resources are identified and presented to users.

FIG. 1 is a block diagram of an example environment in which a visual leaf page analyzer system can be used. A network 102, such as a local area network (LAN), wide area network (WAN), the Internet, or a combination thereof, connects publishers 104, user devices 106, and a search engine 110. The example environment 100 may include many different publishers 104 and user devices 106.

A publisher 104 is any web site that hosts and provides electronic access to a resource by use of the network 102. A web site includes one or more resources 105 associated with a domain name. An example web site is a collection of web pages formatted in hypertext markup language (HTML) that can contain text, graphic images, multimedia content, and programming elements, such as scripts.

A resource is any data that can be provided by the publisher 104 over the network 102 and that is associated with a resource address. Resources include HTML pages, word processing documents, and portable document format (PDF) documents, images, video, and feed sources, to name just a few. The resources includes content, such as words, phrases, pictures, and so on, and may include embedded information (such as meta information and hyperlinks) and/ or embedded instructions (such as JavaScript scripts).

Each resource has an addressable storage location that can be uniquely identified. The addressable location is addressed by a resource locator, such as a universal resource locator (URL). Each resource can reference another resource by use of a resource link. An example resource link is a hypertext markup language (HTML) hyperlink that references another resource by the URL of the resource, or an Xlink in an extensible markup language (XML) document.

Whether a resource link is an incoming resource link or an outgoing resource link depends on the context of the resource link relative to a resource. For example, for a first resource, an outgoing resource link is a resource link in the first resource that addresses a second resource at a URL that is different from the URL of the first resource. For the outgoing resource link, the first resource can be referred to as a "source resource", and the second resource can be referred to as a "target resource." Similarly, an incoming resource link to the first resource is a resource link in a second resource that addresses the first resource. For the incoming resource link, the first resource can be referred to as the "target resource" and the second resource can be referred to as the "source resource."

The resource link may have visible text, such as anchor text, that is visibly distinguished from other text in the resource when rendered on a user device 106. For example, anchor text is often underlined and rendered in a different color to distinguish it from the other text in the resource. Selecting the anchor text, i.e., clicking on the anchor text, causes the user device to request the resource addressed by the URL that is embedded in the resource link.

A resource link can also be associated with an area in an image map (a "hot link") or be an in-line link. Hot links and in-line links do not necessarily have visible text.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

There may be many thousands of publishers that provide access to millions of resources 105 available over the network 102. To facilitate searching of these resources, the search engine 110 identifies the resources by crawling the publishers 104 and indexing the resources provided by the publishers 104. The indexed and, optionally, cached copies of the resources are stored in the page index 114.

The user devices 106 submit search queries 109 to the search engine 110. In response, the search engine 110 uses the page index 114 to identify resources that are relevant to the queries. The search engine 110 identifies the resources in the form of search results 111 and returns the search results 111 to the user devices 106 in search results pages. A search result 111 is data generated by the search engine 110 that identifies a resource that satisfies a particular search query, and includes a resource locator for the resource. An example search result 111 can include a web page title, a snippet of text extracted from the web page, and the URL of the web page. The URL can be provided in the form of a resource link to the web page.

The visual leaf classifier system 120 operating within the environment 100 can classify particular resources 105 as visual leaf pages. As described above, a visual leaf page is a terminal web page, or a web page at which a user can access a particular resource, acquire information, or perform an action about topics described in that page. A visual leaf page is a visual leaf page that is centered on one or more salient images representing the topics described in that page-in other words, the removal of the images in that page will cause it to become significantly less useful. The one or more salient images are particularly prominently displayed within the visual leaf page. For example, a salient image can be larger than all non-salient images. A salient image can be centered within the visual leaf page, or displayed within a particular portion of the page. For example, an image may be a salient image if it is displayed within the top third of a page. If there are multiple salient images, each one can be the same size. A page with resources or content with the primary purpose of allowing users to discover visual leaf pages is not a visual leaf page.

A visual leaf page may be particularly relevant to a search operation if, for example, a user requests image search results from a search engine for a particular type of activity, such as shopping or looking for recipes. This is because visual leaf pages may provide content more relevant to what the user is searching for than a non-visual leaf page. Such activities may involve browsing through images or scrolling through multiple displays of products. For example, if a user submits a search query for "sun dresses to wear to the beach," the system may determine that displaying visual leaf pages that allow users to look at and buy sun dresses is more relevant than providing a definition of sundresses.

The search results are ranked based on scores related to the resources identified by the search results, such as information retrieval ("IR") scores, and optionally a separate authority ranking of each resource relative to other resources. The search results 111 are ordered according to these relevance scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher 104 hosting the resource receives the request for the resource from the user device 106 and provides the resource to the requesting user device 106.

There are many features that the search engine 110 can use when determining the relevance of the resource to a query. Among these features is whether the resource or web page is a visual leaf page. The search engine 110 can access the page index 114 to determine whether particular search results are visual leaf pages, and can use the determination to modify the ranking of particular search results presented in response to a user's search query.

Accordingly, a visual leaf page classifier 120 is used to determine whether a particular resource 105 from a publisher 104 is a visual leaf page. The visual leaf page classifier 120 processes page data 112 of the resources 105 to identify particular resources 105 that are visual leaf pages. For example, the page data 112 includes data for each of multiple pages 105-1, 105-2, through 105-*n*. The visual leaf page classifier 120 includes a model builder 122 and a page analyzer 124. In some examples, the model builder 122 is an offline component and the classifier 124 is an online component. For example, the model builder 122 generates models that represent multiple known visual leaf pages, and the page classifier 124 uses the generated models to determine whether unclassified web pages being returned in response to a query are visual leaf pages.

The visual leaf page classifier 120 determines whether to rank visual leaf pages above non-visual leaf pages in search results for a particular query based on various factors. For example, the visual leaf page classifier 120 can determine from a user-submitted query whether the user actually wants to buy stilettos or if the user wants to find out what stilettos are or how stilettos are made. The determinations made by the visual leaf page classifier can be stored as page data 112 or in the page index 114.

In some implementations, the resources 105 can be represented by a link-graph that displays the relationships between related resources 105, as described in more detail with reference to FIGS. 2A and 2B below. For example, some resources 105 can be linked to by other resources 105. The visual leaf page classifier 120 uses these relationships in addition to other features, including the presence of particular types of content, to determine whether a particular resource 105 is a visual leaf page. These features are described in more detail below.

Figure 2A:
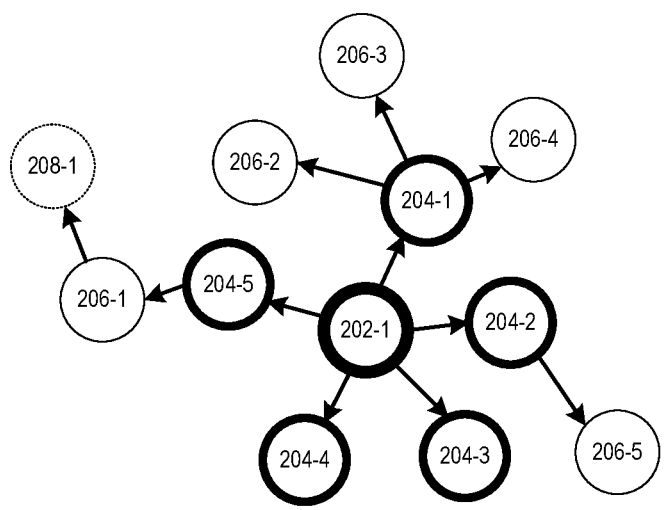
FIGS. 2A-B are graphical representations of digital resources being analyzed and classified.
Figure 2A:
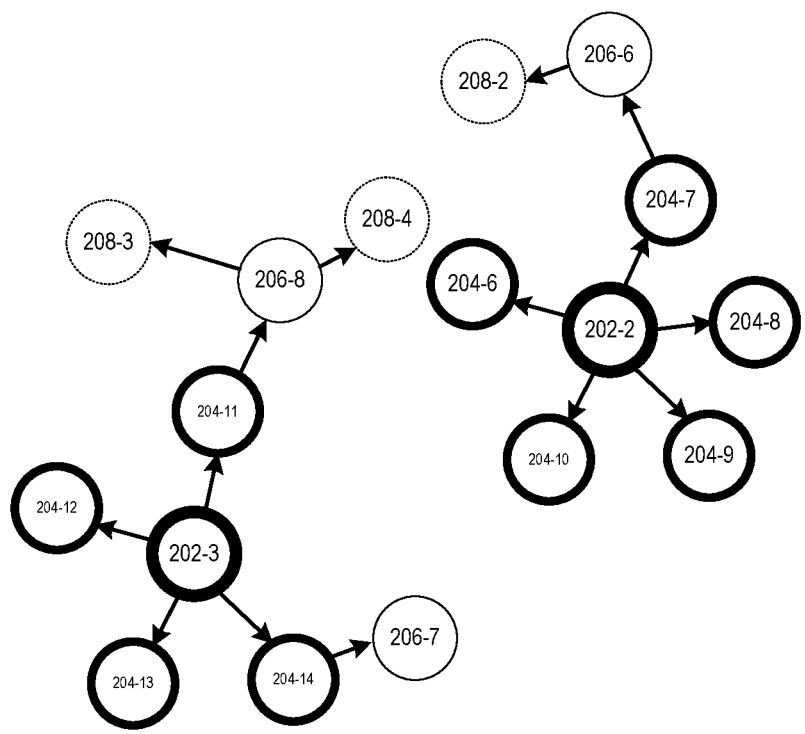

FIG. 2A is an illustration of a link-graph 200 that provides a graphical representation of digital resources being analyzed and classified. A resource classifier system such as the visual leaf page classifier 120 described above with respect to FIG. 1 determines whether particular resources are visual leaf pages according to the context of the resource in the link-graph 200.

FIG. 2A graphically depicts the digital resources in a link graph, where the resources are represented as nodes in the link graph, and the links between each resource are represented as edges between the respective nodes in the graph. In this particular representation, the root of each graph is a hub page, and each child node is a visual leaf page. Each of the hub pages and the visual leaf pages linked to by the hub pages is hosted by a particular host on a particular domain. A host stores digital resources accessible to a user through various networks, such as the Internet. When, in some examples, a host has multiple domains, each domain of the host is treated the same and as part of the host.

Each of the nodes 202-1, 202-2, and 202-3 is a hub page that links to a child visual leaf page node 204. The nodes 204-1 through 204-14 are each visual leaf pages that are linked to by an image-based link from its respective hub page. In this particular example, each of the nodes 204-1 through 204-13 are visual leaf pages that include a salient image that is prominently displayed within the visual leaf page and allows a user to perform an action relating to a topic of the visual leaf page.

FIG. 2A includes child nodes of the child nodes, each of which are pages that are linked to by the visual leaf pages. The nodes 206-1 through 206-8 are each visual leaf pages that are linked to by a link on a visual leaf page 204. The nodes 208-1 through 208-4 are each visual leaf pages that are linked to by a link on a visual leaf page 206. In some examples, pages linked to by image-based links on the visual leaf pages can also be visual leaf pages. For example, if the nodes 206-4, 206-6, 206-7, 206-8, and 208-2 are each linked to by an image-based link, includes a salient image prominently displayed, and allows a user to perform an action relating to a topic of the visual leaf page, then each of the nodes 206-4, 206-6, 206-7, 206-8, and 208-2 are visual leaf pages as well.

The visual leaf page classifier 120 determines whether a particular page is a visual leaf page based on various features of the visual leaf page, including relationships between the particular page and other pages as represented in the link-graph 200. For example, one indication that a given page is a visual leaf page is the existence of a link, containing an associated image, to the given page from a search engine result page (SERP). In such examples, the SERP that contains the image-based link to the given page acts as a hub page. Hub pages may provide access to visual leaf pages through image-based links. Hub pages can be any of various types of pages, including web pages containing articles, blog posts, product pages, etc., and are not limited to SERPs. In some implementations, a visual leaf page can be a hub page. The properties of an example visual leaf page are described in detail below with respect to FIG. 3.

Figure 2B:
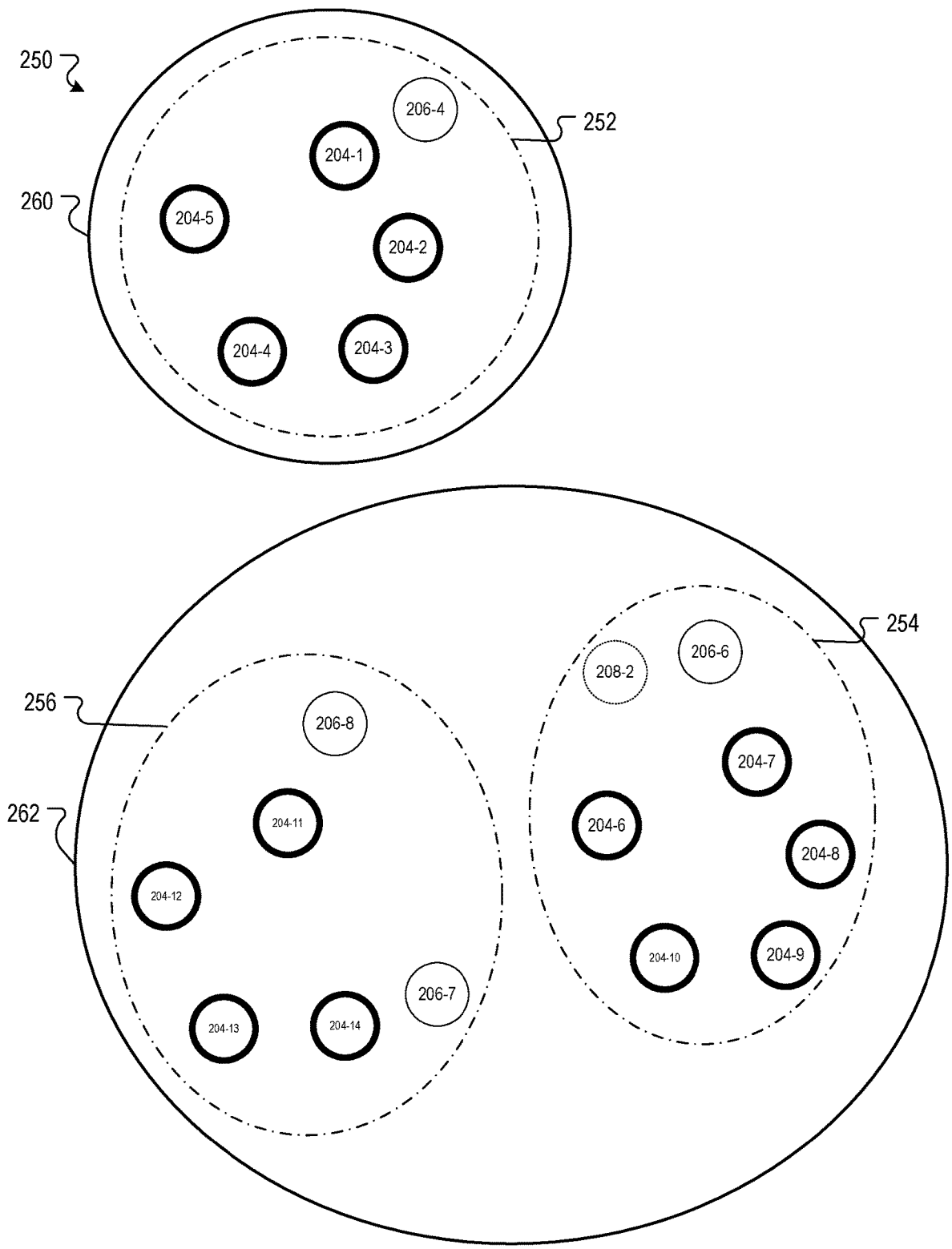

FIG. 2B is an illustration of a link-graph 250 that provides a graphical representation of digital resources being analyzed and classified. FIG. 2B graphically depicts the grouping of visual leaf pages using each visual leaf page's relationships depicted in the link-graph 200 of FIG. 2A.

In this particular example, the visual leaf pages have been identified as the nodes 204-1 through 204-14, and the nodes 206-4, 206-6, 206-7, 206-8, and 208-2. FIG. 2B shows that each of the visual leaf pages is identified and the non-visual leaf pages have been removed from the graphical representation.

The model builder 122 generates visual leaf page clusters based on visual leaf pages that are determined to be similar. The goal of the model builder 122 is to identify sets of aggregate clusters, or chunks, and build models for each chunk such that every visual leaf page within a given host fits the model of one chunk, and that no non-visual leaf pages fit the models of any chunks. In this particular example, the model builder 122 uses a bottom-up approach to identify the set of chunks within a particular host. In some examples, the visual leaf pages are hosted by a different host than the hub page that links to the particular visual leaf page. For example, a hub page may be a fashion blog post, while each visual leaf page from the hub page is hosted by a department store's website. In such examples, the visual leaf pages are grouped together based on the host of the hub page that links to each of the visual leaf pages. First, small clusters of similar visual leaf pages are selected from the particular host. Similar clusters of visual leaf pages are then grouped together to form a visual leaf page site chunk.

For a page to be considered as a visual leaf page by the model builder 122 during the generation of clusters, the page must satisfy one or more of the following criterion a large rendered salient image, a large salient video, an og:image markup, product metadata, or recipe metadata, in addition to having an image-based link from a hub page.

In some examples, the model builder 122 analyzes the structure of the page for grid-like arrangement to make sure that it is not an SERP. In some examples, an SERP includes large, salient images in addition to having an image-based link from a hub page. For example, a fashion blog page may provide an image-based link to an SERP for styling a navy blazer with a white dress. In this example, the SERP would not be a visual leaf page, because the SERP only facilitates navigating to another page in response to the selection of a particular search result.

If a hub page has a sufficient number of visual leaf pages that satisfy the criteria of the model builder 122, the visual leaf pages are considered to belong to a same visual leaf page cluster. A sufficient number of visual leaf pages can be a predetermined number, a number determined based on the size of the host, etc. Using this criterion, the model builder 122 generates small clusters of similar visual leaf pages that are grouped together by their hub pages.

The clustered similar visual leaf pages serve as a starting point for a training set. However, because the clusters initially only include visual leaf pages that were detected by subsequent processing of hub pages, the clusters may not include visual leaf pages that do not have hub pages. Therefore, in order for the cluster model to generalize beyond the visual leaf pages determined from the baseline training set, or the seed visual leaf pages, the model should be able to detect other visual leaf pages which may not have an associated hub page. Once the model builder 122 has determined that a particular visual leaf page is hosted on the particular host and is linked to by a corresponding hub page, the model builder 122 extracts features of the visual leaf page and uses the extracted features to generate a cluster of visual leaf pages.

Various features of the web pages can be extracted from every seed visual leaf page in a hub page based cluster. For example, the URL depth of the seed visual leaf page, the number of reasonably large images on the page, the presence of an og:image markup, the number of paragraphs/sections/chapters in the page, the presence of recipe metadata in the page, the number of unique visible videos in the page. The URL depth of a web page is the length of the different levels of the page's URL, and can be represented by a vector that indicates the number of levels of the URL. For example, http://www.example-page.com/level1/level2/ has two levels and therefore a path depth of 2, and may be represented by a vector such as <2>. In some examples, the vector representing the URL depth of a page indicates the length of each level of the URL. For example, http://www.example-page.com/2017/level1/level2/level3 has four levels and therefore a path depth of 4, and may be represented by a vector such as <4, 6, 6, 6>.

A visual leaf page cluster represents multiple similar visual leaf pages. In some examples, a visual leaf page cluster stores the mean and standard deviation of each of the features extracted across all of the visual leaf pages in the cluster. For example, if a hub page-based cluster includes twenty visual leaf pages, then the mean and standard deviation of each of the features extracted across all twenty of the visual leaf pages stored. The mean and standard deviation of the features extracted across each of the visual leaf pages included in a cluster can be stored in a vector that represents the central tendency of the features extracted across the cluster. For example, if each visual leaf page within a particular chunk has six features and there are fifteen visual leaf pages, the cluster can be represented by a 15×6 matrix.

The mean and standard deviation for each column can be represented by a vector with a length of 6. The vector is considered the center of the cluster, and provides a generalized model for the visual leaf pages within the cluster.

The clusters of visual leaf pages are represented by the groupings 252, 254, and 256 of the visual leaf pages within the link-graph 250. Each of the groupings 252, 254, and 256 includes visual leaf pages that share a hub page. In some examples, the model builder 122 stores each of the clusters generated as page data 112 or in the page index 114.

The model builder 122 creates small visual leaf page clusters containing similar visual leaf pages that have the same hub page. In some examples, particular hosts can have very large numbers of hub pages, and therefore many clusters. The visual leaf page classifier 120 uses the generated clusters to classify whether a given page is a visual leaf page, and a large number of clusters comes with a correspondingly large computation time.

A particular site may have multiple different clusters. However, when processing web pages by use of the generalized models for the multiple different clusters, having a relatively large number of different clusters may result in processing latency when applying the models to each search result. To reduce computation time and latency when returning ranked search results to a user device that submitted a query, the model builder 122 merges similar visual leaf page clusters that are determined to be similar.

The model builder 122 can merge similar clusters within a particular host based on various features of the clusters, such as URL depth of the visual leaf pages of the clusters or the values of the extracted features for each of the visual leaf pages. In some examples, the model builder 122 compares the centers of the clusters to determine whether the centers are less than a threshold distance apart. The threshold distance can be predetermined by a user of the environment 100 or determined based on various features of the clusters, such as the number of clusters within a particular host, the mean distance between clusters within the particular host, etc. If two clusters are less than the threshold distance apart, the model builder 122 combines the clusters into visual leaf page site chunks.

The model builder 122 combines clusters by generating a new center for the combined clusters that represents the center of all of the visual leaf pages included in the clusters being combined. For example, the model builder 122 can determine the mean and standard deviation for each feature extracted across all of the visual leaf pages within the clusters being combined to generate a new vector that represents the center of the combined clusters. In some examples, the model builder 122 stores the new vector in the page data 112 or page index 114.

The model builder 122 combines the clusters into chunks to build a minimal set of chunks that model the contained visual leaf pages, such that each chunk covers as many visual leaf pages as possible while maintaining a threshold level of similarity between the visual leaf pages.

The visual leaf page chunks, or models, are represented in FIG. 2B by the groupings 260 and 262. Each of these models represents a grouping of multiple visual leaf pages that share a threshold level of similarity with each of the other visual leaf pages in the model.

The page analyzer 124 uses the chunk vectors, or models, to determine whether a given resource in a particular host is a visual leaf page by comparing the given resource with each model within the particular host. The page analyzer 124 determines whether the given resource has a threshold amount of similarity to the visual leaf page chunks and classifies the given resource as a visual leaf page if the given resource has at least the threshold amount of similarity to a model within the particular host. For example, the page analyzer 124 can find the Euclidean distance between the center of the chunk and the features of the given resource. The page analyzer 124 can determine the similarity of the given resource to the model using various other methods, including calculating the number of features of the given resource that exactly match the features of the model or determining whether the URL depth of the model matches the given resource.

In some implementations, a particular page can fit within multiple models. The page analyzer 124 classifies a page as a visual leaf page as soon as the page is within a threshold amount of the center of a model, and in such examples, the fact that a page fits within different models does not affect whether the page analyzer 124 classifies the page as a visual leaf page.

Figure 3:
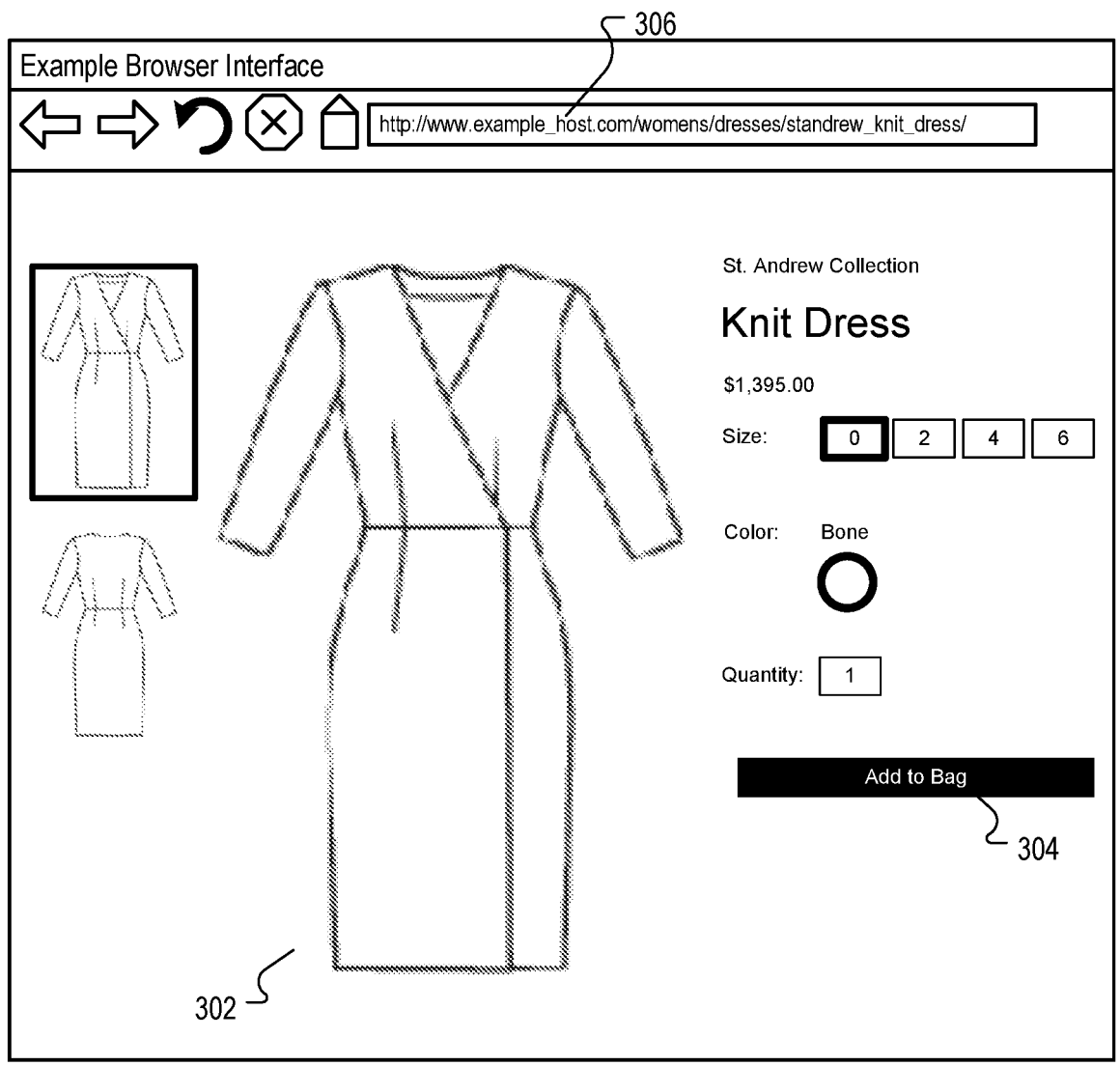
FIG. 3 is an illustration of an example visual leaf page.

FIG. 3 is an illustration of an example visual leaf page 300. The visual leaf page 300 can be accessed through a digital computing environment such as the environment 100.

In some examples, a visual leaf page can be independent of a hub page. In such examples, a terminal document for a particular image can be a visual leaf page. The terminal document includes a salient image that is prominently displayed, and allows a user to perform an action related to a topic represented within the terminal document.

The visual leaf page 300 includes a salient image 302 that is prominently displayed within the page 300. The image 302 is larger than the other images on the page, and is displayed within a central part of the page 300. An image can also be a salient image if it is at least as large as a predetermined size specified by a user of the environment 100, it is displayed within a predetermined area of a page, etc.

The visual leaf page 300 allows a user to perform an action related to a topic of the page 300. In this example, the topic is dresses, and the action is ordering the dress shown in the salient image 302. A user can order the dress using the user interface element 304. In this example, the element 304 is a button that allows a user to add the dress to their digital shopping bag.

The visual leaf page 300 is linked to by a hub page hosted by a particular host indicated by the address 306. In this example, the host is Example Host, and the visual leaf page 300 has a URL depth of three.

Figure 4:
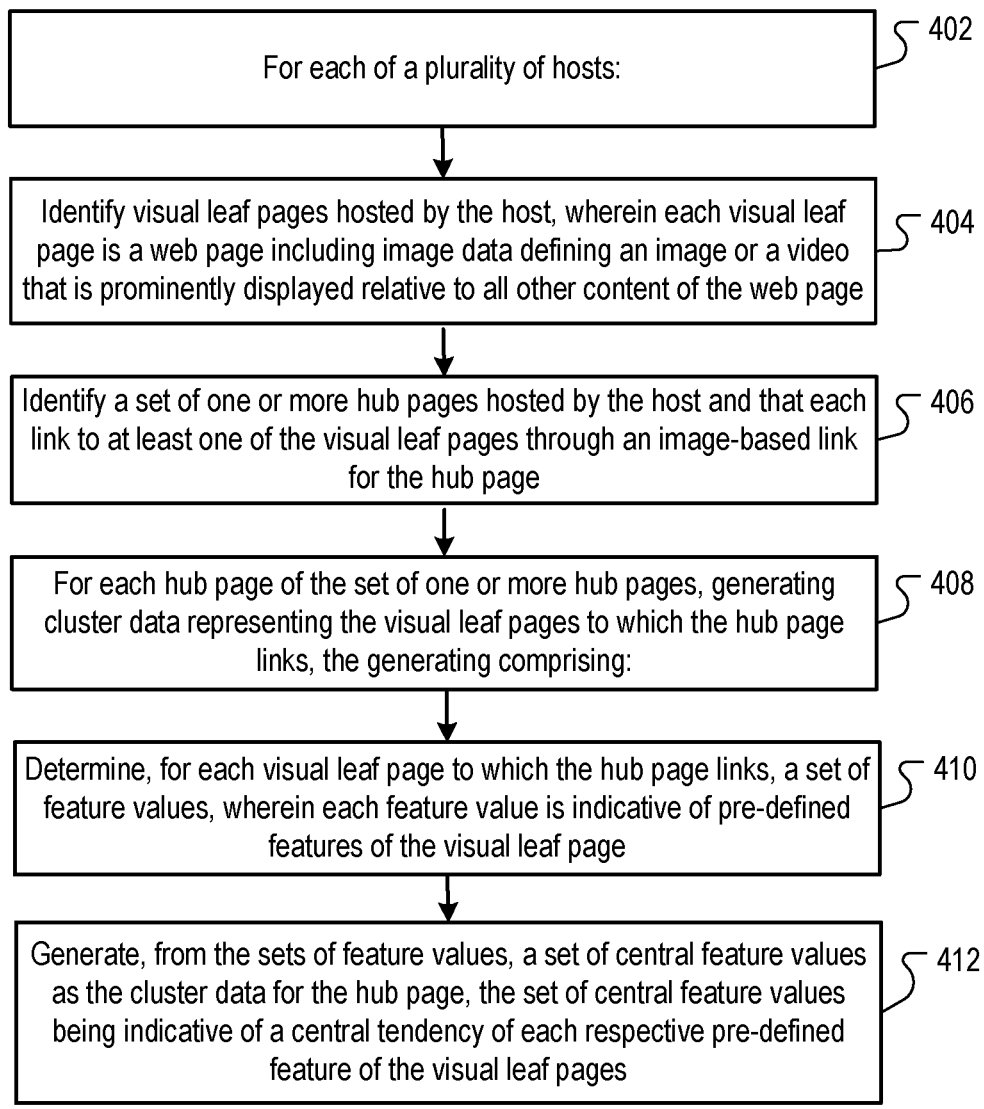
FIGS. 4-5 are example processes for analyzing and classifying digital resources.

FIG. 4 is a flow chart of an example process 400 for analyzing and classifying digital resources. In some implementations, the process 400 can be implemented by one or more computers. For example, the process 400 can be implemented by the visual leaf page classifier 120 and its components.

The process 400 is repeated for each of multiple hosts that host digital resources that are potential search results (402). For example, for a database of web pages that could be returned when a user submits a query, the process 400 could be repeated for each of the hosts that hosts one of the web pages within the database.

The process 400 continues when the visual leaf page classifier 120 identifies visual leaf pages hosted by the host, where each visual leaf page is a web page including image data defining an image or a video that is prominently displayed relative to all other content of the web page (404). For example, the visual leaf page classifier 120 can identify pages that include an image that is larger than all of the other images on the page as visual leaf pages.

In some examples, identifying visual leaf pages hosted by the host is based on a semantic analysis of the image or video compared to all the other content of the page meeting a threshold of relatedness. For example, the visual leaf page classifier 120 can determine whether content of a salient image on a particular page is at least a threshold amount of related to the other content of the page, and if so, the visual leaf page classifier 120 can identify the particular page as a visual leaf page.

In some examples, identifying visual leaf pages hosted by the host is based on determining that the image data indicates a customizable selection of images. For example, the visual leaf page classifier 120 can determine that a particular web page is a visual leaf page if the particular web page includes multiple images that a user can select to view as a larger image or to view as the main, salient image, such as on an item page of a shoe store website.

In some examples, wherein identifying visual leaf pages hosted by the host is based on determining that the image or video is shown in a central portion of the web page and is at least a threshold proportion larger in area than all the other content on the web page. For example, the visual leaf page classifier 120 can determine that a particular page is a visual leaf page based on determining that the particular page includes an image that is displayed within the central third of the particular page and is at least 40% larger than all of the other content on the web page. The threshold proportion can be various proportions, and can be specified by a user of the environment 100.

In some examples, wherein identifying visual leaf pages hosted by the host is based on determining that the image data indicates a grid-like structure of a plurality of images or videos. For example, the visual leaf page classifier 120 can determine that a particular page is not a visual leaf page because the particular page is a search engine result page that displays a grid-like arrangement of images that match a user-submitted query.

The process 400 continues when the visual leaf page classifier 120 identifies a set of one or more hub pages hosted by the host and that each link to at least one of the visual leaf pages through an image-based link for the hub page (406). For example, the visual leaf page classifier 120 can identify hub pages, such as cooking websites, that each link to at least one of the visual leaf pages, which provide various recipes for dishes to make for dinner, through an image of the recipe.

The process 400 continues when, for each hub page of the set of one or more hub pages, the model builder 122 generates cluster data representing the visual leaf pages to which the hub page links (408). The model builder 122 of the visual leaf page classifier 120 can generate cluster data, such as the representative vector as described with respect to FIGS. 2A-B.

The process 400 continues, as the generating includes determining, by the model builder 122 and for each visual leaf page to which the hub page links, a set of feature values, wherein each feature value is indicative of pre-defined features of the visual leaf page (410). For example, the feature values can include whether each visual leaf page includes a large rendered salient image, a large salient video, product metadata, recipe metadata, or code markups such as og:image.

The process 400 continues, as the generating includes generating, by the model builder 122 and from the sets of feature values, a set of central feature values as the cluster data for the hub page, the set of central feature values being indicative of a central tendency of each respective pre-defined feature of the visual leaf pages (412). For example, the model builder 122 can generate a vector that represents the center of the cluster as described above with respect to FIGS. 2A-2B.

In some examples, the visual leaf page classifier 120 generates cluster data for each hub page of the set of one or more hub pages. The cluster data represent the visual leaf pages to which the hub page links by determining that each of the visual pages to which the hub page links has a same URL depth. For example, the visual leaf page classifier 120 can determine that each of the visual leaf pages has the URL depth of 3, and can determine that the visual leaf pages should be clustered together.

In some examples, the set of feature values for the visual leaf page is a vector that has an element for each feature value in the set of feature values.

In some examples, the cluster data for the hub page is a vector that has, for each feature value in the set of feature values, elements of a mean and a standard deviation of the feature value, and the cluster model is a vector that also has elements of a mean and a standard deviation for each feature value in the set of feature values. For example, the cluster data for a hub page and the cluster mode can each be represented by a vector that has pairs of values that indicate the mean and standard deviation of each of the visual leaf page features.

Figure 5:
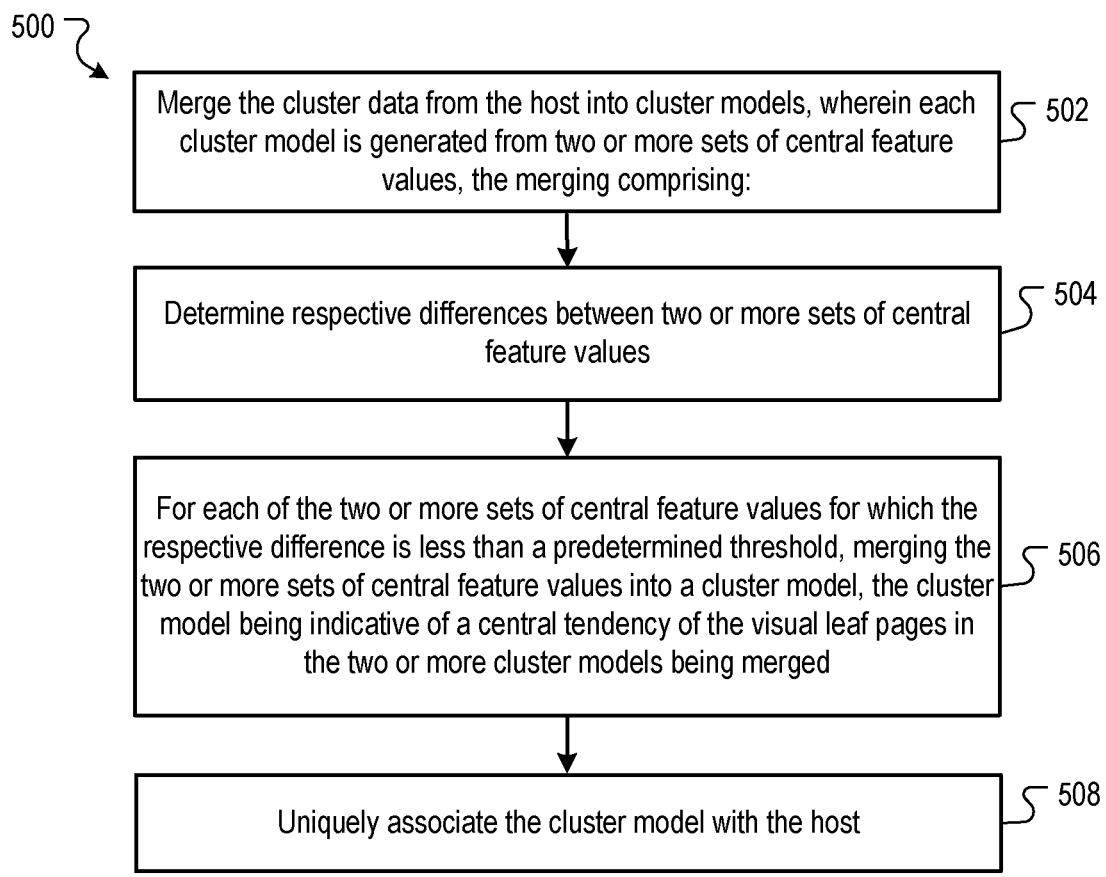

FIG. 5 is a flow chart of an example process 500 for analyzing and classifying digital resources. The process 500 can be a part or a continuation of the process 400, and can be performed by the visual leaf page classifier 120 and its components.

The process 500 includes merging, by the model builder 122, the cluster data from the host into cluster models, where each cluster model is generated from two or more sets of central features values (502). For example, the model builder 122 can merge the visual leaf page clusters as described above with respect to FIGS. 2A-2B.

The process 500 continues, as the merging includes determining, by the model builder 122, respective differences between two or more sets of central feature values (504). For example, the model builder 122 can calculate the Euclidean distance between the centers of the visual leaf page clusters as described above with respect to FIGS. 2A-2B.

The process 500 continues, as the merging includes merging, by the model builder 122 and for each of the two or more sets of central feature values for which the respective difference is less than a predetermined threshold, the two or more sets of central features into a cluster model, the cluster model being indicative of a central tendency of the visual leaf pages in the two or more cluster models being merged (506). For example, the model builder 122 can determine that two visual leaf page clusters are less than a predetermined threshold distance apart and merge the two clusters together into a chunk, or a model, by generating a new cluster center vector.

The process 500 continues, as the merging includes uniquely associating, by the model builder 122, the cluster model with the host (508). For example, the model builder 122 can store the new model vector in the page index 114 or the page data store 114.

The model vectors that represent two or more merged visual leaf page clusters. The model vectors can be used by a search system to determine whether particular search result pages are visual leaf pages. Such a search system can use visual leaf page classifier 120 to identify search result pages that are visual leaf pages, and alter an authority score for the identified search result page. For example, the search system can increase an authority score for identified visual leaf pages and present the identified visual leaf pages before presenting non-leaf page results. In such examples, the process 500 includes receiving, at the visual leaf page classifier 120, data indicative of a web page responsive to a query, the data including a set of feature values for the web page, wherein each feature value is indicative of a pre-defined feature of the web page, and data indicating a host of the web page. The process 500 can further include identifying, by the page analyzer 124 and based on the host of web page, cluster models that are uniquely associated with the host and applying each of the identified cluster models to the web page to generate a respective model score for the web page. The process 500 can further include selecting, by the page analyzer 124, a model score that is a highest model score of the respective model scores; determining whether the selected model score for the web page meets a predetermined threshold model score. In response to determining that the selected model score for the web page meets the threshold model score, the process 500 includes classifying, by the page analyzer 124, the web page as a visual leaf page.

In some examples, the web page has a corresponding authority score for the query, and the process 500 includes modifying, based on the classification of the web page as a visual leaf page, the authority score, or a search score, for the web page.

Figure 6:
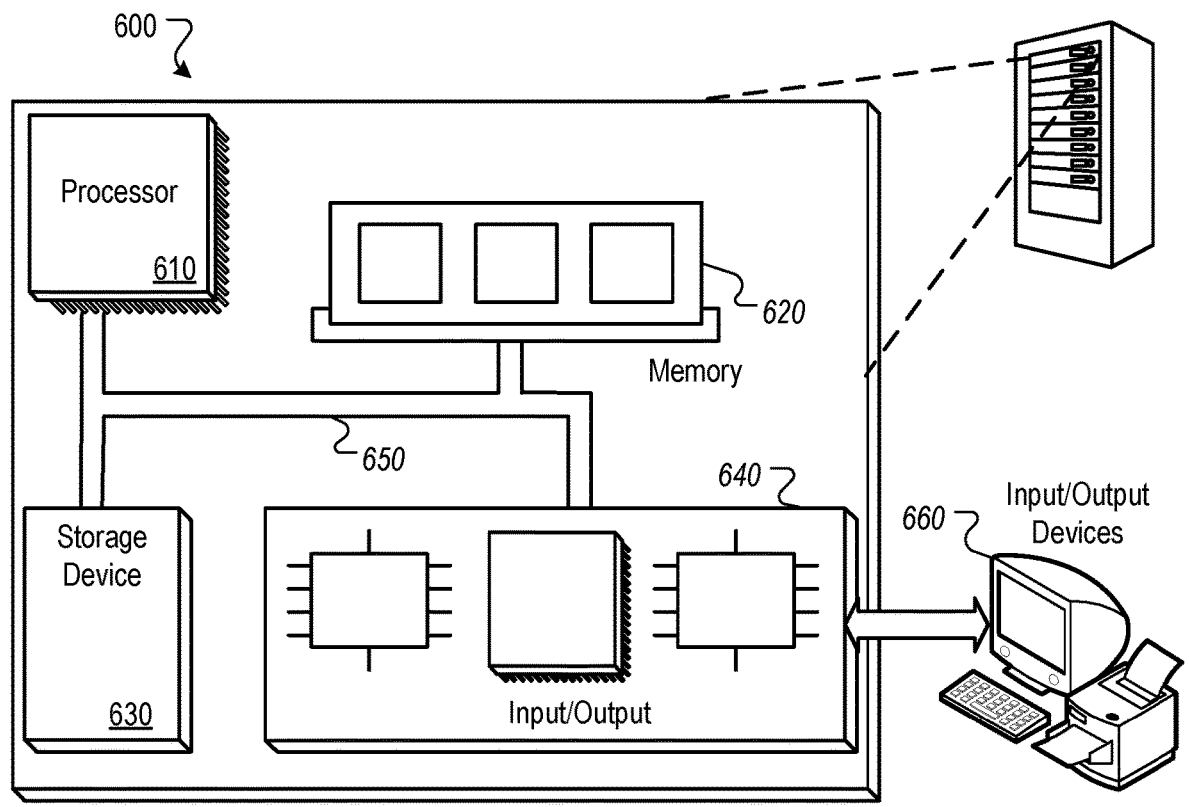
FIG. 6 is a block diagram of an example computing system.

FIG. 6 is block diagram of an example computer system 600 that can be used to perform operations described above. The system 600 includes a processor 610, a memory 620, a storage device 630, and an input/output device 640. Each of the components 610, 620, 630, and 440 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television user devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
for each of a plurality of hosts:
identifying, by one or more computers, visual leaf pages hosted by the host, wherein each visual leaf page is a web page including image data defining an image or a video that is prominently displayed relative to all other content of the web page;

identifying, by the one or more computers, a set of two or more hub pages hosted by the host and that each link to at least one of the visual leaf pages through an image-based link on the hub page; and for each hub page of the set of two or more hub pages, generating, for the hub page, cluster data representing the visual leaf pages to which the hub page links, the generating comprising:

determining, for only each visual leaf page to which the hub page links, a set of feature values comprising two or more feature values respectively indicative of pre-defined features of the visual leaf page, one or more of the two or more feature values indicative of a layout of content on the visual leaf page; and generating, from the sets of feature values from only the visual leaf pages to which the hub page links, a set of central feature values as the cluster data for the hub page, the set of central feature values being indicative of a central tendency of each respective pre-defined feature of the two or more feature values of the visual leaf pages to which the hub page links;

wherein the cluster data generated for each hub page in the set of two or more hub pages is separate from the cluster data generated for each other hub page in the set of two or more hub pages;

receiving, by the one or more computers, data indicative of a web page responsive to a search query;

classifying, by the one or more computers, using a visual leaf page classifier trained by a baseline set of data comprising at least the cluster data, the web page as a visual leaf page based at least in part on a comparison of a set of feature values associated with the web page to the set of central feature values for at least one of the set of two or more hub pages;

determining, by the one or more computers, that the search query requests image search results for a particular type of activity; and based on the classification of the web page as a visual leaf page and on the determination that the search query requests image search results for a particular type of activity, increasing, by the one or more computers, a search score associated with the web page.

2. The method of claim 1, further comprising, for each host of the plurality of hosts:

merging the cluster data from the host into cluster models, wherein each cluster model is generated from two or more sets of central feature values, the merging comprising:

determining respective differences between two or more sets of central feature values;

for each of the two or more sets of central feature values for which the respective difference is less than a predetermined threshold, merging the two or more sets of central feature values into a cluster model, the cluster model being indicative of a central tendency of the visual leaf pages in the two or more cluster models being merged; and uniquely associating the cluster model with the host.

3. The method of claim 2, wherein the data indicative of the web page responsive to the search query indicates a host of the web page, the method further comprising:

identifying, based on the host of web page, cluster models that are uniquely associated with the host;

applying each of the identified cluster models to the web page to generate a respective model score for the web page;

selecting a model score that is a highest model score of the respective model scores;

determining whether the selected model score for the web page meets a predetermined threshold model score; and in response to determining that the selected model score for the web page meets the threshold model score, classifying the web page as a visual leaf page.

4. The method of claim 1, wherein, for at least one of the set of two or more hub pages, one or more of the predefined features corresponds to a size, a quantity, or a location of one or more visual content items.

5. The method of claim 1, wherein identifying visual leaf pages hosted by the host is based on a semantic analysis of the image or video compared to all the other content of the page meeting a threshold of relatedness.

6. The method of claim 1, wherein identifying visual leaf pages hosted by the host is based on determining that the image data indicates a customizable selection of images.

7. The method of claim 1, wherein identifying visual leaf pages hosted by the host is based on determining that the image or video is shown in a central portion of the web page and is at least a threshold proportion larger in area than all the other content on the web page.

8. The method of claim 1, wherein identifying visual leaf pages hosted by the host is based on determining that the image data indicates a grid-like structure of a plurality of images or videos.

9. The method of claim 1, wherein for each hub page of the set of one or more hub pages, generating cluster data representing the visual leaf pages to which the hub page links further comprises determining that each of the visual pages to which the hub page links has a same URL depth.

10. The method of claim 1, wherein the set of feature values for the visual leaf page is a vector having an element for each feature value in the set of feature values.

11. The method of claim 1, wherein the cluster data for the hub page is a vector having, for each feature value in the set of feature values, elements of a mean and a standard deviation of the feature value; and wherein the cluster model is a vector having, for each feature value in the set of feature values, elements of a mean and a standard deviation of the feature value.

12. A system comprising:
one or more computers;
a data store storing instructions that when executed by the one or more computers, cause the one or more computers to perform operations comprising:
for each of a plurality of hosts:
identifying, by the one or more computers, visual leaf pages hosted by the host, wherein each visual leaf page is a web page including image data defining an image or a video that is prominently displayed relative to all other content of the web page;
identifying, by the one or more computers, a set of two or more hub pages hosted by the host and that each link to at least one of the visual leaf pages through an image-based link on the hub page; and
for each hub page of the set of two or more hub pages, generating, for the hub page, cluster data representing the visual leaf pages to which the hub page links, the generating comprising:

determining, for only each visual leaf page to which the hub page links, a set of feature values comprising two or more feature values respectively indicative of pre-defined features of the visual leaf page, one or more of the two or more feature values indicative of a layout of content on the visual leaf page; and generating, from the sets of feature values from only the visual leaf pages to which the hub page links, a set of central feature values as the cluster data for the hub page, the set of central feature values being indicative of a central tendency of each respective pre-defined feature of the two or more feature values of the visual leaf pages to which the hub page links;

wherein the cluster data generated for each hub page in the set of two or more hub pages is separate from the cluster data generated for each other hub page in the set of two or more hub pages;

receiving data indicative of a web page responsive to a search query;

classifying, using a visual leaf page classifier trained by a baseline set of data comprising at least the cluster data, the web page as a visual leaf page based at least in part on a comparison of a set of feature values associated with the web page to the set of central feature values for at least one of the set of two or more hub pages;

determining that the search query requests image search results for a particular type of activity; and based on the classification of the web page as a visual leaf page and on the determination that the search query requests image search results for a particular type of activity, increasing a search score associated with the web page.

13. The system of claim 12, the operations further comprising, for each host of the plurality of hosts:

merging the cluster data from the host into cluster model, wherein each cluster model is generated from two or more sets of central feature values, the merging comprising:

determining respective differences between two or more sets of central feature values;

for each of the two or more sets of central feature values for which the respective difference is less than predetermined threshold, merging the two or more sets of central feature values into a cluster model, the cluster model being indicative of a central tendency of the merged two or more sets of central feature values; and uniquely associating the cluster model with the host.

14. The system of claim 13, wherein the data indicative of the web page responsive to the search query indicates a host of the web page, and wherein the operations further comprise:

identifying, based on the host of web page, cluster models that are uniquely associated with the host;

applying each of the identified cluster models to the web page to generate a respective model score for the web page;

selecting a model score that is a highest model score of the respective model scores;

determining whether the selected model score for the web page meets a predetermined threshold model score; and in response to determining that the selected model score for the web page meets the threshold model score, classifying the web page as a visual leaf page.

15. The system of claim 12, wherein, for at least one of the set of two or more hub pages, one or more of the predefined features corresponds to a size, a quantity, or a location of one or more visual content items.

16. The system of claim 12, wherein identifying visual leaf pages hosted by the host is based on determining at least one of:

a semantic analysis of the image or video compared to all the other content of the page meets a threshold of relatedness;

the image data indicates a customizable selection of images;

the image or video is shown in a central portion of the web page and is at least a threshold proportion larger in area than all the other content on the web page; and the image data indicates a grid-like structure of a plurality of images or videos.

17. A non-transitory computer readable medium storing instructions that when executed by one or more computing devices, cause the one or more computing devices to perform operations comprising:

for each of a plurality of hosts:

identifying visual leaf pages hosted by the host, wherein each visual leaf page is a web page including image data defining an image or a video that is prominently displayed relative to all other content of the web page;

identifying a set of two or more hub pages hosted by the host and that each link to at least one of the visual leaf pages through an image-based link on the hub page; and for each hub page of the set of two or more hub pages, generating, for the hub page, cluster data representing the visual leaf pages to which the hub page links, the generating comprising:

determining, for only each visual leaf page to which the hub page links, a set of feature values comprising two or more feature values respectively indicative of pre-defined features of the visual leaf page, one or more of the two or more feature values indicative of a layout of content on the visual leaf page; and generating, from the sets of feature values from only the visual leaf pages to which the hub page links, a set of central feature values as the cluster data for the hub page, the set of central feature values being indicative of a central tendency of each respective pre-defined feature of the two or more feature values of the visual leaf pages to which the hub page links;

wherein the cluster data generated for each hub page in the set of two or more hub pages is separate from the cluster data generated for each other hub page in the set of two or more hub pages;

receiving data indicative of a web page responsive to a search query;

classifying, using a visual leaf page classifier trained by a baseline set of data comprising at least the cluster data, the web page as a visual leaf page based at least in part on a comparison of a set of feature values associated with the web page to the set of central feature values for at least one of the set of two or more hub pages;

determining that the search query requests image search results for a particular type of activity; and based on the classification of the web page as a visual leaf page and on the determination that the search query requests image search results for a particular type of activity, increasing a search score associated with the web page.

18. The non-transitory computer readable medium of claim 17, the operations further comprising for each host of the plurality of hosts:
  merging the cluster data from the host into cluster model, wherein each cluster model is generated from two or more sets of central feature values, the merging comprising:
    determining respective differences between two or more sets of central feature values;
    for each of the two or more sets of central feature values for which the respective difference is less than predetermined threshold, merging the two or more sets of central feature values into a cluster model, the cluster model being indicative of a central tendency of the merged two or more sets of central feature values; and
  uniquely associating the cluster model with the host.

19. The non-transitory computer readable medium of claim 18, wherein the data indicative of the web page responsive to the search query indicates a host of the web page, and wherein the operations further comprise:
  identifying, based on the host of web page, cluster models that are uniquely associated with the host;
  applying each of the identified cluster models to the web page to generate a respective model score for the web page;
  selecting a model score that is a highest model score of the respective model scores;
  determining whether the selected model score for the web page meets a predetermined threshold model score; and
  in response to determining that the selected model score for the web page meets the threshold model score, classifying the web page as a visual leaf page.

20. The non-transitory computer readable medium of claim 17, wherein, for at least one of the set of two or more hub pages, one or more of the predefined features corresponds to a size, a quantity, or a location of one or more visual content items.

* * * * *